United States Patent [19]

Lupke

[11] Patent Number: 5,803,132
[45] Date of Patent: Sep. 8, 1998

[54] SKINNED DOUBLE WALL PIPE AND APPARATUS FOR MAKING SAME

[76] Inventor: Manfred A. A. Lupke, 10 McLeary Court, Concord, Ontario, Canada, L4K 2Z3

[21] Appl. No.: 687,184

[22] Filed: Jul. 25, 1996

Related U.S. Application Data

[62] Division of Ser. No. 337,031, Nov. 10, 1994, Pat. No. 5,542,834.

[51] Int. Cl.⁶ .................................. F16L 11/00; F16L 9/14
[52] U.S. Cl. ............................ 138/141; 138/121; 138/137
[58] Field of Search ...................... 138/137, 140, 138/141, DIG. 1, DIG. 7, 121, 122

[56] References Cited

U.S. PATENT DOCUMENTS

| | | | |
|---|---|---|---|
| 4,269,234 | 5/1981 | Johnson et al. ........................ | 138/121 |
| 4,342,612 | 8/1982 | Lalikos et al. ...................... | 138/121 X |
| 4,620,569 | 11/1986 | Von Glanstatten et al. ........ | 138/121 X |
| 4,627,844 | 12/1986 | Schmitt ................................ | 138/137 X |
| 4,812,348 | 3/1989 | Rau .................................... | 138/137 X |
| 5,148,837 | 9/1992 | Agren et al. ........................ | 138/137 X |
| 5,284,184 | 2/1994 | Noone et al. ....................... | 138/137 X |
| 5,439,454 | 8/1995 | Lo et al. ............................. | 138/137 X |
| 5,469,892 | 11/1995 | Noone et al. ....................... | 138/137 X |
| 5,560,398 | 10/1996 | Pfleger ............................... | 138/141 X |
| 5,588,468 | 12/1996 | Pfleger ............................... | 138/141 X |
| 5,611,373 | 3/1997 | Ashcraft ............................. | 138/137 X |

FOREIGN PATENT DOCUMENTS

| | | | |
|---|---|---|---|
| 64-83035 | 10/1990 | Japan ..................................... | 138/121 |
| 1585-613-A | 8/1990 | U.S.S.R. ................................ | 138/121 |

*Primary Examiner*—Patrick F. Brinson

[57] ABSTRACT

A double wall thermoplastic pipe has a flat inner wall, a corrugated outer wall and a skin of reduced thickness relative to and between the walls. The skin is secured continuously along one of the walls and is secured to the other of the walls at spaced apart locations along the pipe where the pipe walls are adhered to one another by the skin.

3 Claims, 4 Drawing Sheets

SKINNED DOUBLE WALL PIPE AND APPARATUS FOR MAKING SAME

This is a Divisional application of application Ser. No. 08/337,031 filed on Nov. 10, 1994 now U.S. Pat. No. 5,542,834.

FIELD OF THE INVENTION

The present invention relates to a skinned double wall pipe and an extrusion die for simultaneously making and applying the skin to the pipe.

BACKGROUND OF THE INVENTION

The use of double wall pipe is becoming more and more popular and these pipes which can vary tremendously in size have many benefits over pipes having a single wall construction.

Extrusion dies for forming double wall pipes have been available on the market for some time now. Although the design of these dies may vary from one manufacturer to another, they all typically include an upstream injector which feeds plastic to parallel spaced apart plastic flow lines from which the plastic is extruded to form inner and outer pipe walls. These pipes may have smooth walls or they may have different configurations, such as a ribbed wall or the like.

In many applications, virgin material is required even though less expensive recycled material is available. However, due to its inherent make-up, this recycled material will not provide certain requirements, such as chemical stability and smoothness in the pipe wall. Furthermore, it is very difficult to introduce coloring to a conventionally formed double wall pipe. Wall coloring of the pipe can be very useful for things such as pipe identification purposes, and the like.

SUMMARY OF THE INVENTION

The present invention provides a skinned double wall pipe and an apparatus for making skinned double wall pipe.

The provision of a skin on a double wall pipe provides numerous benefits which are not possible with conventionally unskinned double wall pipes. By way of example only, in cases where specific pipe properties are required for conveying material through the pipe, these properties can be provided by introducing a pipe skin formed from virgin material which will produce the required properties while the main walls of the pipe may be made from a much less expensive recycled material. As other examples, coloring agents, stabilizers, etc. can also be provided on the pipe through the use of the skin rather than being in the main body of the pipe.

According to an aspect of the invention, a double wall thermoplastic pipe has a flat inner wall, a corrugated outer wall and a skin of reduced thickness relative to and between the walls. The skin is secured continuously along one of the walls and secured to the other of the walls at spaced apart locations along the pipe where the pipe walls adhered to one another by the skin.

The apparatus for forming double wall skinned pipe comprises an extrusion die having an elongated tubular body into which flowing plastic is injected. The tubular body is formed with first and second plastic flow channels. The first flow channel guides the flowing plastic to a first extrusion orifice in the die for making the outer pipe wall and the second flow channel guides the flowing plastic to a second extrusion orifice in the die for making the inner pipe wall. In addition, the die includes an injection opening to at least one of the plastic flow channels through which further plastic is injected to form the skin on the pipe. This injection opening can be provided to the first plastic flow channel for forming skin on the outer wall of the pipe or to the second plastic flow channel for forming a skin on the inner pipe wall or to both the first and the second plastic flow channels for forming a skin on both the outer and the inner pipe walls.

BRIEF DESCRIPTION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION

Figure 1:
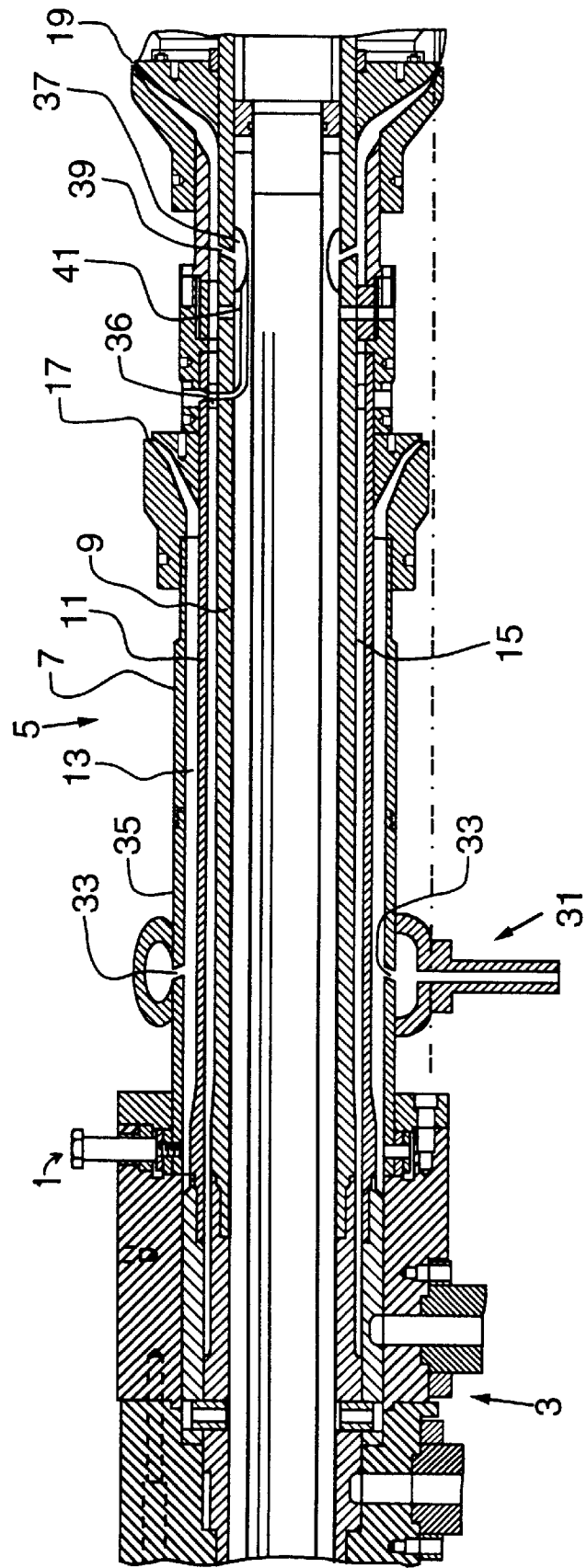
FIG. 1 is a sectional view through the plastic flow region of an extruder die according to a preferred embodiment of the present invention.

FIG. 1 shows a section of an extruder die generally indicated at 1. This die has an upstream end 3 into which plastic material is fed by an injector in a flowing state. The die includes an elongated tubular region generally indicated at 5 downstream of the injection end. Tubular region 5 is formed by an outer tube wall 7, an inner tube wall 9 and a middle wall 11 between the two tube walls 7 and 9. The plastic as it flows down the extruder die, is divided into a first plastic flow channel 13 between walls 7 and 11 and into a second plastic flow channel 15 between walls 9 and 11. Channel 13 feeds to an extrusion orifice 17 while channel 15 feeds to an extrusion orifice 19.

Figure 3:
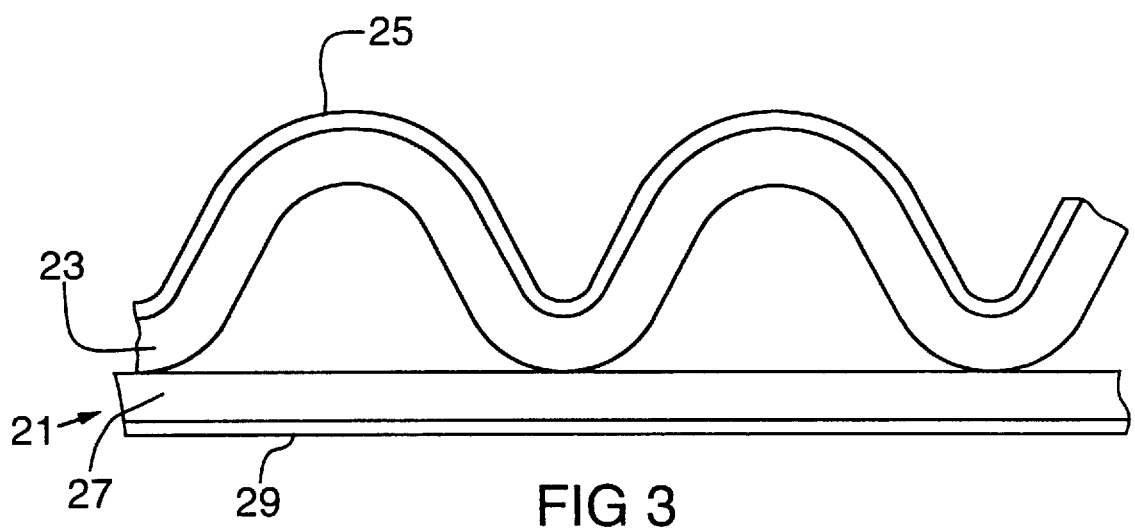
FIG. 3 is a sectional view through one side of a double wall pipe made in accordance with a preferred embodiment of the present invention.

The plastic flowing from the first extrusion orifice 17 will form the outer pipe wall while the plastic flowing from the second extrusion orifice 19 will form the inner pipe wall. The shape of the pipe will be determined by the shape of the mold surfaces (not shown) into which the plastic flows from the two extrusion orifices. By way of example only, FIG. 3 shows a double wall pipe generally indicated at 21 having a ribbed outer wall 23 and a flat inner wall 27. This is only, one of many shapes that can be used when working with the extruder die of FIG. 1.

Returning to FIG. 1, an extrusion device generally indicated at 31 is in the form of a ring wrapping around the outer tube wall 7. Tube wall 7 is provided with an injection opening 33 into the flow channel 13. Injector 31 and the injection opening 33 are also well seen in FIG. 2 of the drawings. Here, it should be noted that injector 31 is located upstream of the first extrusion orifice 17 but downstream of the main injector end 3 of the die into which the plastic is injected for forming the pipe walls.

A second injection opening 39 is provided through the inner tube wall 9 to plastic flow channel 15. A small channel 41 supplied plastic by an injection path through a spider interiorly of the tubular housing which feeds to an accumulator chamber 37 that, in turn feeds the injection opening 39.

Here, it should be noted that injection opening 39 is upstream of the second extrusion orifice 19.

The operation of the extruder die is as follows:

A parison of plastic material is injected into the die at the injection end 3. This plastic flows along the two flow channels 13 and 15. While the plastic is in a hot flowing state, skinning material is introduced to the channel 13 through the injection opening 33 which is fed by injection device 31. The material injected through injection opening 31 flows directly onto the exterior surface of the plastic material already flowing through channel 13. This skinning material, because of its heated state, then bonds with the plastic material already in the channel which is also in the heated state to form a co-extrusion at the extrusion orifice 17. This co-extrusion comprises the outer pipe wall 23 and a skin 25 on the outer pipe wall as seen in FIG. 3 of the drawings. The skin 25 is formed from the material which is injected at injection opening 33.

In order to provide skin to the interior surface of the pipe, skinning material is introduced in a flowing state by an injection device which may be similar to device 31 along channel 41 to the accumulator chamber 37 which then feeds injection opening 39. This skinning material meets with the plastic already flowing in flow channel 15 and coats the interior of the plastic material. The two materials bind with one another to form a co-extrusion at the extrusion orifice 19. FIG. 3 of the drawings shows the inner pipe wall 27 provided with an interior skin 29.

Figure 2:
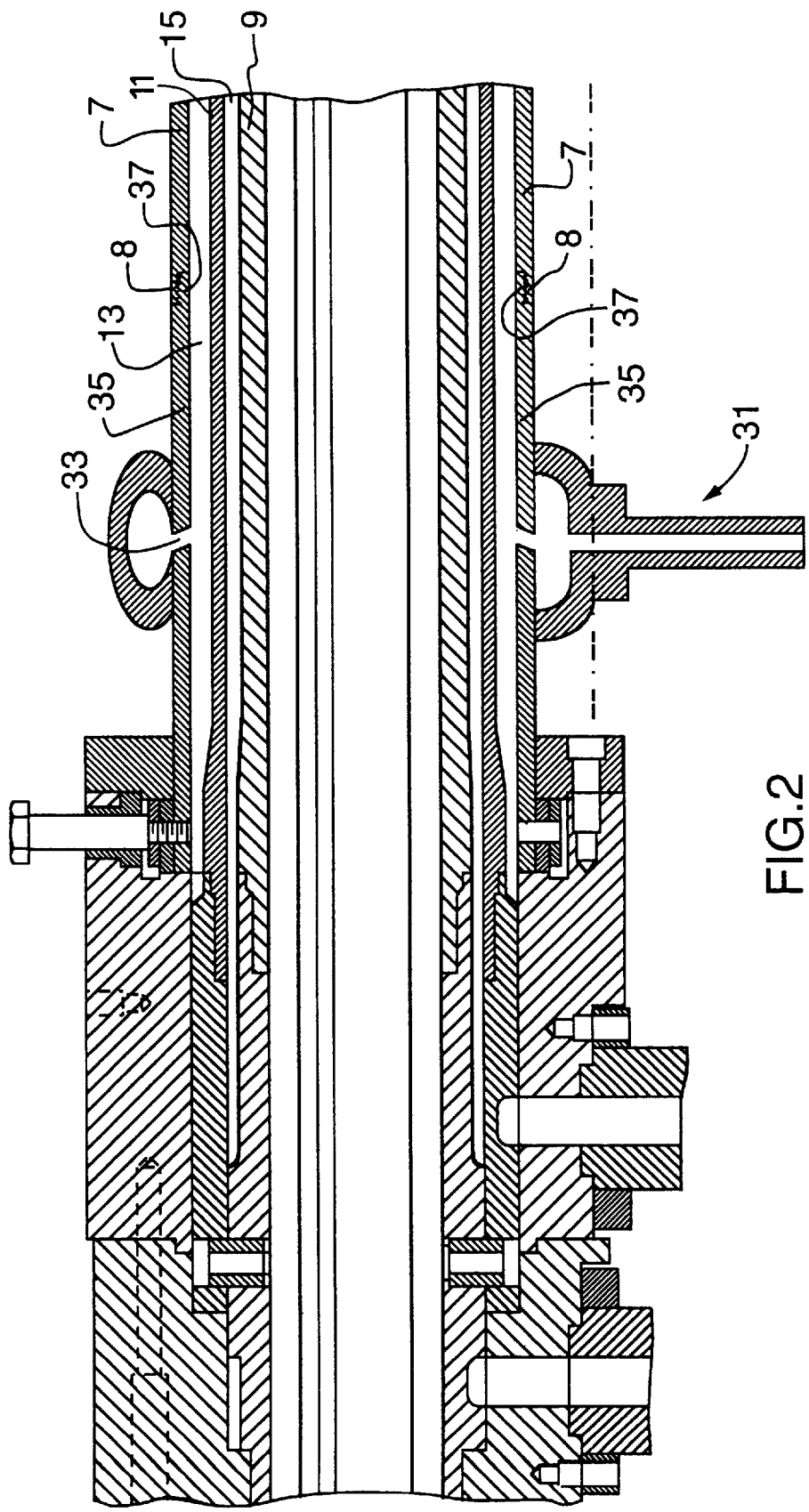
FIG. 2 is an enlargement of the skin injection region from the extruder die in FIG. 1.

It is desirable to have the ability to vary the thickness of the skin on the pipe or to even eliminate the skin entirely. FIG. 2 of the drawings shows the outer tube wall as including a tube wall section 35 having a threaded end 37 which engages with the threaded end 8 of the tube wall 7. This threaded connection of the tube wall section 35 allows it to be moved axially of the die to adjust the gap of injection opening 31 or, if desired, to completely close the injection opening. Similar or other adjustment systems can also be provided at the injection opening 39.

It should be noted that although the drawings show that the injection opening for the outer skin and the injection opening for the inner skin are at different locations along the length of the die, they can also be located at the same location within the die directly opposite one another.

It should also be appreciated that other adjustment systems can be used for adjusting or varying the gap in either of the injection-openings.

Figure 5:
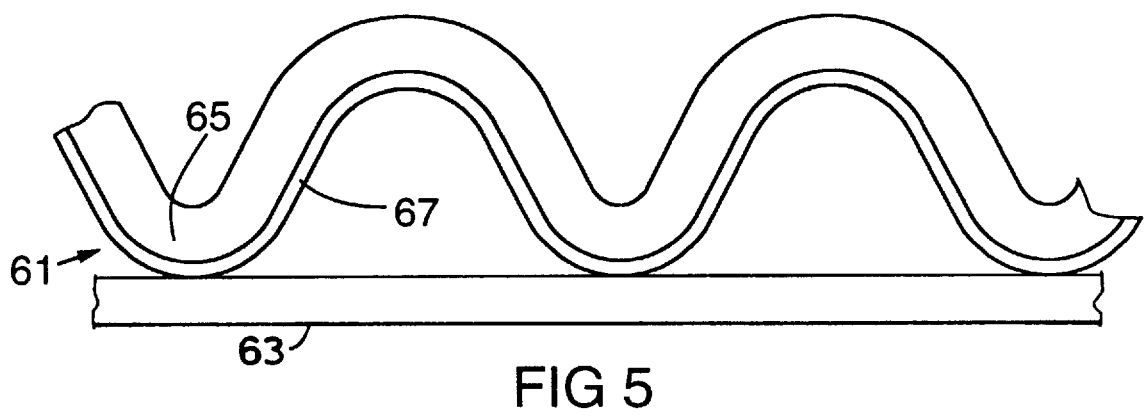
FIG. 5 is a sectional view through one side of a double walled pipe made from the die of FIG. 4.
Figure 4:
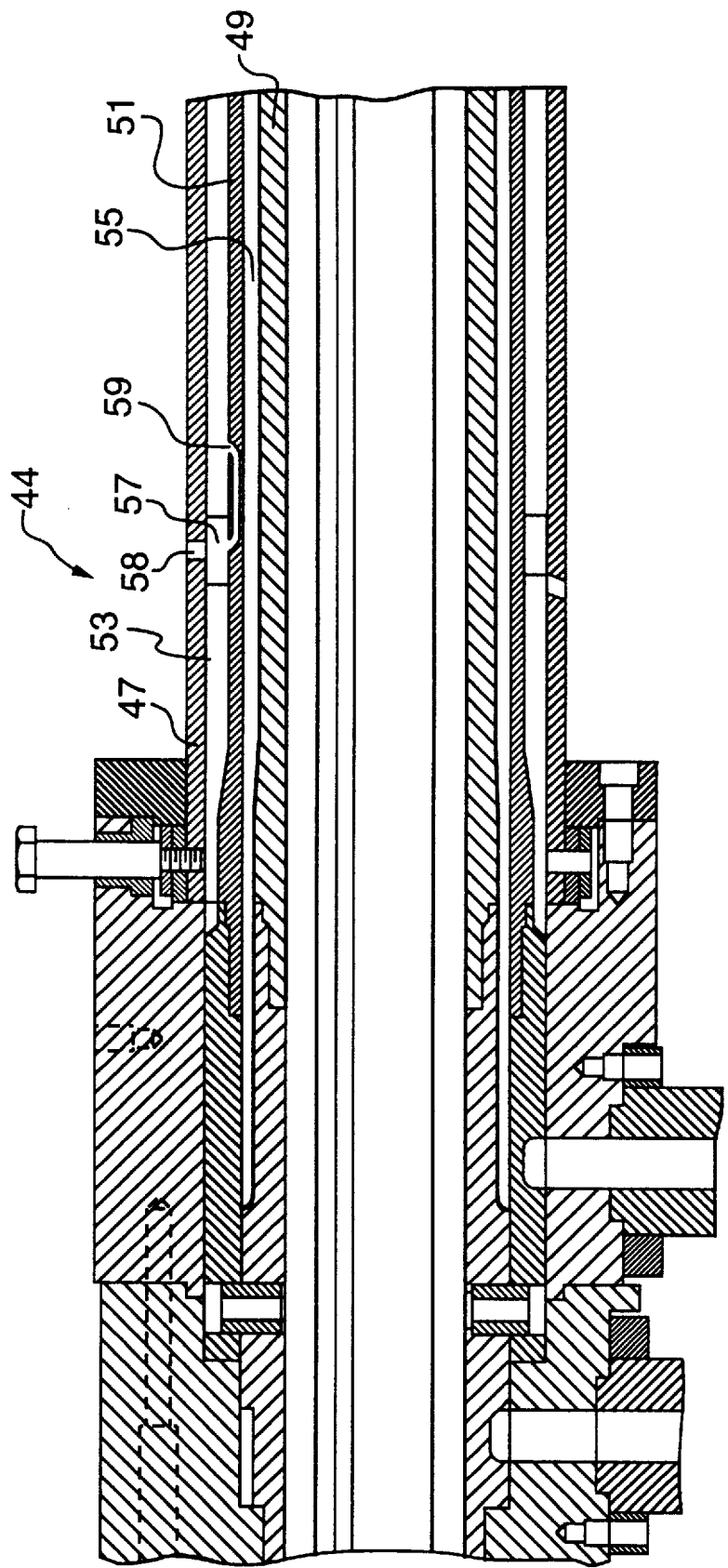
FIG. 4 is a sectional view through the plastic flow region of an extruder die modified from that shown in FIG. 1.

The description above relates to the application of a skin to the outer surface of the outer pipe wall and the inner surface of the inner,pipe wall. FIG. 4 on the other hand shows a die 44 for the application of a skin between the two pipe walls and FIG. 5 shows the actual pipe or tube formed using the device of FIG. 4.

The basic construction of the die of FIG. 4 is very similar to the die shown in FIG. 2. It includes an outer die wall 47, a middle die wall 51 and an interior die wall 49 with plastic flow channels 53 and 55 being located between the various different die walls. However rather than including skin injection paths to the outer side of the outer plastic flow channel and to the inner side of the inner plastic flow channel, die 44 is provided with a spider 57 which carries a skin injection path 58 to an accumulator and injection opening 59. This injection opening injects to the inside of the outer plastic flow channel 53 to produce a double wall pipe 61 having an outer pipe wall 65, an inner pipe wall 63 and a skin 67 which acts as a bonding agent or adhesive to hold the two pipe walls together where they meet as shown in FIG. 5.

Figure 6:
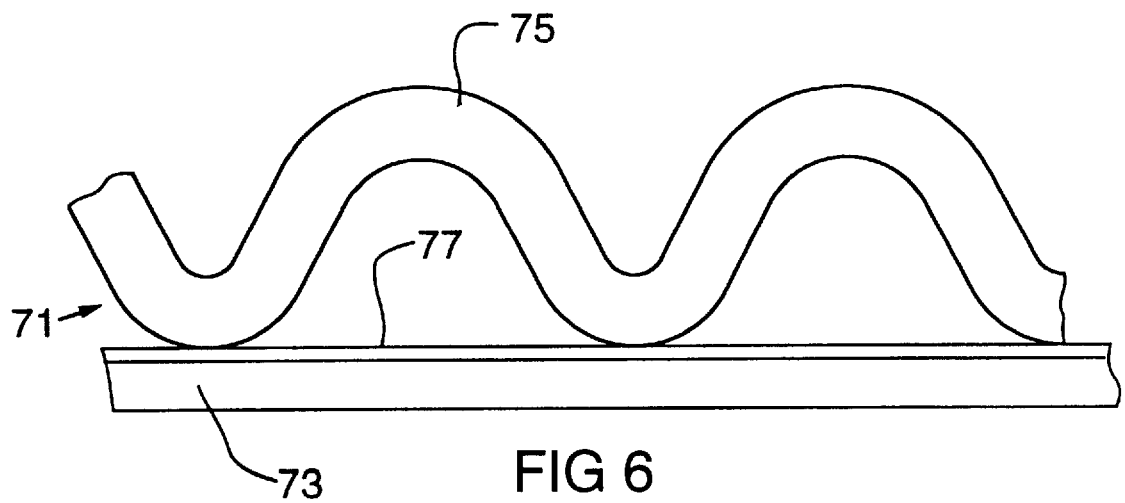
FIG. 6 is a sectional view through one side of a double wall pipe modified from that shown in FIG. 5.

Although FIG. 4 shows the injection of the skin to the inner side of the outer plastic flow channel, the die can also easily be set up to inject the skin to the outer side of the inner flow channel to produce a pipe 71 as shown in FIG. 6 having an inner pipe wall 73, an outer pipe wall 75 and a skin 77. This is achieved by relatively minor modifications to the spider 58 and by having the injection opening 59 open onto the inner rather than the outer plastic flow channel.

It will be clearly understood from the description above, that a double wall pipe made in accordance with the present invention can use recycled, less expensive plastic material in the formation of the main pipe walls while being coated with a skin made from virgin material and giving the pipe required properties for different applications. The skin, however, is much thinner than the main pipe walls and therefore substantially reduces the cost of the pipe in comparison to pipe made completely from virgin material. In addition, coloring agents, stabilizers, etc. can be added to the pipe through the use of the pipe skin.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A double wall thermoplastic pipe having a flat inner wall, a corrugated outer wall and a skin of reduced thickness relative to and between said walls, said skin being secured continuously along one of said walls and being secured to the other of said walls at spaced apart locations along said pipe where said pipe walls are adhered to one another by said skin.

2. A double wall thermoplastic pipe as claimed in claim 1, wherein said skin is secured continuously along said inner wall and is secured at the spaced apart locations to said outer wall.

3. A double wall thermoplastic pipe as claimed in claim 1, wherein the skin is secured continuously along said outer wall and is secured at the spaced apart locations to said inner wall.

* * * * *